July 17, 1951 P. C. NEILSEN 2,560,735
RASP LOADING FIXTURE
Filed Nov. 8, 1947 2 Sheets-Sheet 1

INVENTOR.
Peter C. Neilsen
BY
Zabel & Gutzbaugh
Attorneys

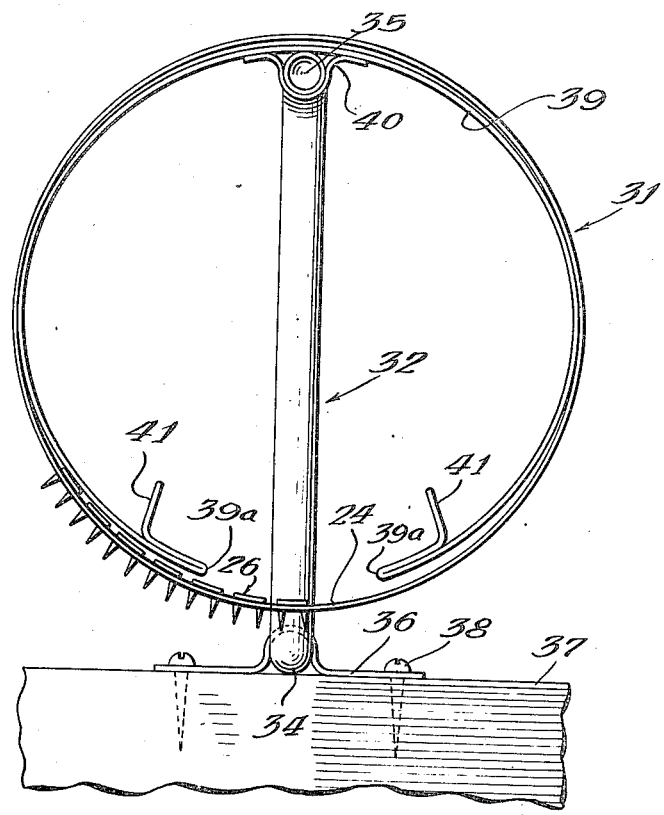

Patented July 17, 1951

2,560,735

UNITED STATES PATENT OFFICE 2,560,735

RASP LOADING FIXTURE

Peter C. Neilsen, Chicago, Ill.

Application November 8, 1947, Serial No. 784,867

1 Claim. (Cl. 29—284)

The present invention relates to a fixture for use in assembling a tire rasp which is principally applicable to a drum type rasp wherein a perforated steel band is mounted on a drum and toothed elements are held between the band and the drum with the teeth projecting outwardly through the perforations. This drum or wheel is mounted on a shaft or arbor for rotation and the outwardly projecting teeth are spaced throughout the extent of the peripheral face of the thus banded wheel. As the wheel is rotated at a relatively high velocity the moving teeth form an effective abrading surface against which a rubber tire may be applied for preparing the tire surface for vulcanizing or recapping.

When assembly the tire rasp of the type contemplated by the present invention the toothed elements must be inserted with the teeth projecting through the apertures in the steel band and to accomplish this the present invention serves as a fixture for holding the parts in such a manner as to facilitate the assembly operations.

Thus it is an object of the present invention to provide a relatively simple and yet effective fixture for holding the various parts of a tire rasp during the assembly operation.

Further and other objects of the present invention will become apparent from the following description and the drawings, in which Fig. 1 is a side elevational view of a completely assembled rasp of the type to be assembled on the fixture forming the subject matter of the present invention;

Fig. 5 is a front elevational view of the fixture forming the subject matter of the present invention and illustrating the band mounted in place on the fixture for insertion of the toothed elements;

Fig. 6 is a view corresponding to Fig. 5 but showing the fixture without the band; and Fig. 7 is a side elevational view of the fixture shown in Fig. 6.

Figure 1:
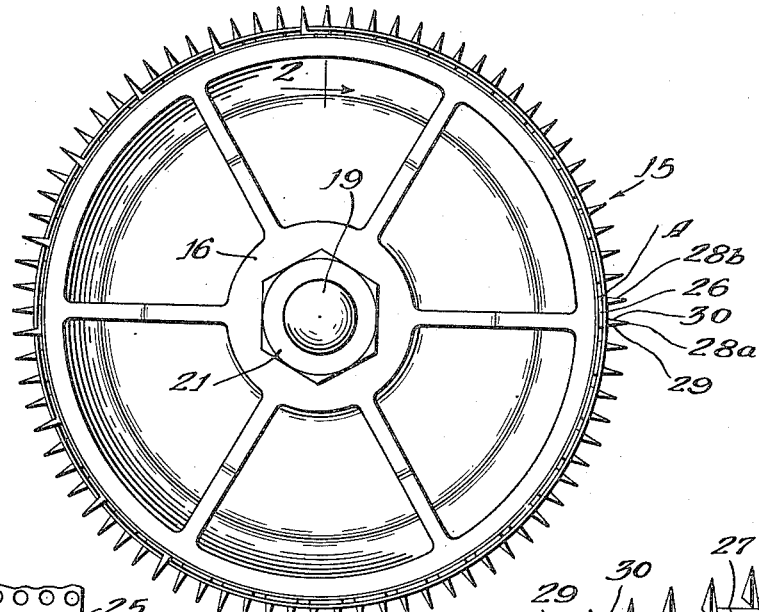

For purposes of illustration a single embodiment only of the present invention has been selected for description herein, it being recognized, however, that many modifications may be made in the specific embodiment shown without departing from the intended scope of the invention.

Referring to the drawings and particularly to Figs. 1 to 4 inclusive the tire rasp applicable for assembly on the fixture forming the subject matter of the present invention is illustrated generally at 15 and includes a drum made up of a pair of web faces 16 that are provided with peripheral flanges 17 on which is supported an annular band generally indicated at 18. When in use the assembly is mounted on a shaft 19 threaded at one end as at 20 to receive one or more nuts 21.

Figure 3:
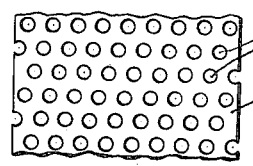
Fig. 3 is a fragmentary plan view of a peripheral band that holds the toothed elements on the drum.

The band 18 comprises an annular cushion element 22 about which is mounted an annular backing sheet 23. A perforated band or tooth element holding member 24 is mounted circumferentially about the backing sheet 23 and as shown in Fig. 3 this holding member 24 is perforated throughout its area as indicated at 25, the perforations being arranged in horizontal alignment extending transversely across the holding member. A toothed element 26 in the form of a relatively flat plate-like member 27 is provided along its marginal side edges with a plurality of teeth 28 that all extend in the same direction substantially at right angles to the plane of the plate-like member 27. These toothed members 26 are adapted to be held by the holding member 24 with the plate-like portion 27 resting against the underneath face of the holding member 24 and the teeth projecting through the apertures 25 in the perforated band or holding member 24.

Figure 4:
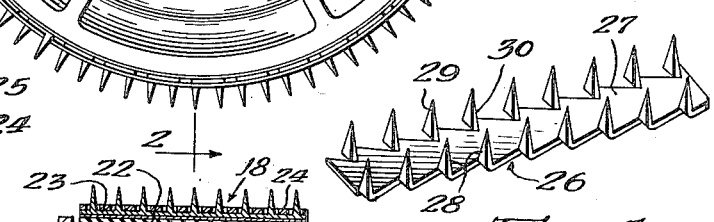
Fig. 4 is an enlarged perspective view of one of the toothed elements.

Referring now to Fig. 4 the teeth 28 of the toothed elements 26 are each provided with a chisel or cutting edge 29 that faces outwardly in a lateral direction along the outer vertical edge of each tooth. The inner face 30 of each tooth is relatively blunt. The teeth are spaced substantially at equal distances along both edges of the toothed element 26 and the teeth along one edge are out of alignment with respect to the teeth along the other edge of the toothed element so that in effect the teeth on both edges are staggered.

Referring to Fig. 1 let it be assumed that the rasp 15 is rotated in a clockwise direction on the shaft or arbor 19. One of the toothed elements 26 is designated by A in Fig. 1 and in this toothed element the row of teeth indicated at 28a would include the leading teeth since the rasp is rotating in a clockwise direction, whereas the row of teeth 28b would include the following teeth. The leading edge of each of the leading teeth in row 28a is the chisel or sharp edge 29 illustrated in Fig. 4, whereas the opposite edge 30 of each of the teeth 28a constitutes the blunt edge. Each of the teeth in row 28b has its sharp or chisel edge disposed on the rear side with respect to the direction of rotation of the rasp 15.

In its operation the rasp 15 is rotated and an automobile tire casing or the like to be vulcanized or recapped is brought into engagement with the rotating teeth on the rasp. The teeth cut and wear the rubber on the surface of the tire and otherwise prepare the tire for a subsequent vulcanizing or recapping operation. During this operation the teeth often wear out or break so that their replacement becomes necessary. The replacement of worn out or broken toothed elements can be simply accomplished by merely disassembling the rasp 15 by first removing nut or nuts 21 and withdrawing the rasp from the arbor 19. This allows for separation of the various elements making up the rasp band 18 so that the worn out or broken toothed element 26 may be removed and replaced with a new one. When reassembling the parts the present invention serves as a fixture for holding the band to permit easy installation of the toothed element.

Referring now to Figs. 5 to 7 inclusive the fixture forming the subject matter of the present invention is generally indicated at 31 and comprises generally an upright stand 32 that includes a vertical member 33, a lower rearwardly extending leg 34 and an upper forwardly extending arm 35. The rearwardly extending leg 34 is welded or otherwise secured to a base bracket 36 that is adapted to be screwed down onto a bench 37 by some suitable means such as screws 38. Mounted on the upper arm 35 is a substantially annular supporting band 39 that is fixed to the arm 35 by means of a bracket 40 that is welded to the supporting band 39 and to the upper arm 35 of the upright stand 32. This supporting band 39 is a plate that is formed substantially as a hoop except that its ends are spaced apart and formed with grasping members 41 on the ends thereof. Supporting band 39 is normally disposed as shown in solid lines in Fig. 6 with the free ends of the band spaced a considerable distance apart and this member is resilient to the extent that by squeezing the grasping members 41 together the ends of the band can be drawn together as indicated by the broken lines 41a. Upon releasing this punching force the band returns to its more or less circular condition shown in solid lines in Fig. 6 with the free ends of the band spaced apart.

Figure 2:
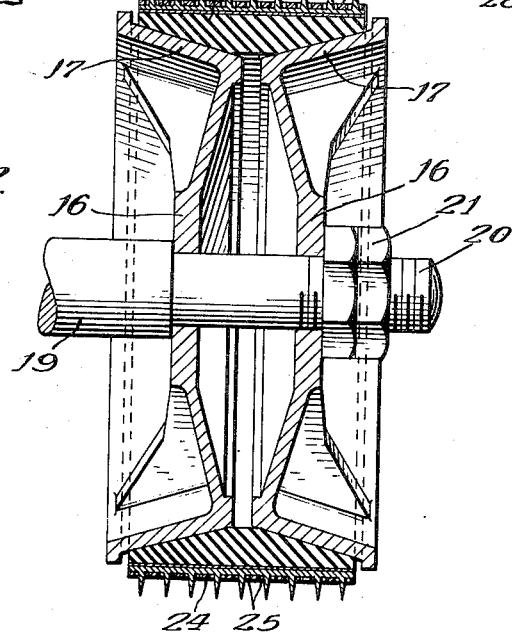
Fig. 2 is a vertical sectional view taken through the line 2—2 of Fig. 1.

In its operation the fixture is mounted on a suitable bench as shown in Fig. 5 and the perforated band 24 of the tire rasp 15 shown in Figs. 1 and 2 is mounted circumferentially about the supporting band 39. The diameter of the supporting band 39 is decreased to allow the perforated band 24 to be so mounted by pinching together the spaced grasping members 41 as previously described. After the perforated band 24 has been thus installed the supporting band 39 is allowed to return to its normal position so as to engage the inner face of the perforated band 24 substantially throughout its circumference as illustrated in Fig. 5.

It will now be noted that the portion of the perforated band 24 that lies between the spaced ends 39a of the band 39 is unobstructed and accessible for insertion of the toothed element 26 in the perforations of the perforated band 24. As these toothed elements 26 are thus inserted the perforated band 24 is rotated about the supporting band 39 and this is accomplished by pinching together the grasping members 41 to free the perforated band 24 from the supporting band 39. In this manner the toothed elements 26 are all inserted in the perforated bands 24 throughout the entire circumference of the latter band and when this is completed the backing sheet 23 (see Fig. 2) is inserted inside the perforated band 24 so as to hold the toothed elements 26 in place. The insertion of this backing member 23 is accomplished by again squeezing together the grasping members 41 a sufficient distance to permit the backing member 23 to be inserted between the inner faces of the toothed elements 26 and the outer face of the supporting band 39. When the backing member 23 has been thus so placed with respect to the toothed element 26 and the perforated band 24 the assembly can then be removed from the fixture 31. This removal is accomplished by again squeezing together the grasping members 41 so as to reduce the diameter of the supporting band 39, thus freeing the toothed assembly and allowing it to be removed from the fixture. This toothed assembly is now in condition for mounting on the cushion element 22 (Fig. 2) and then the web faces 16 of the drum are mounted inside the cushion element 22 after which the rasp is ready for mounting on the shaft or arbor 19.

I claim:

A rasp loading fixture comprising an upright support, a substantially annular split band having spaced apart end edges, means mounting the split band on the support with the spaced apart edges disposed downwardly, the mounting means engaging the band only at the diametrically opposite side from the spaced apart edges, the band being unsupported throughout its depth so that the spaced apart edges throughout their entire lengths can be brought together to decrease the diameter of the annulus, and a grasping member mounted on each end edge.

PETER C. NEILSEN.

REFERENCES CITED

The following references are of record in the file of this patent:

UNITED STATES PATENTS

| Number | Name | Date |
|---|---|---|
| 1,232,528 | Gemmill | July 10, 1917 |
| 1,998,296 | Walker | Apr. 16, 1935 |
| 2,164,264 | Waterman | June 27, 1939 |
| 2,358,110 | Simon | Sept. 12, 1944 |